(12) United States Patent
Monsen et al.

(10) Patent No.: US 10,473,025 B2
(45) Date of Patent: Nov. 12, 2019

(54) ROTARY MOTOR

(71) Applicants: Stein Kyrre Monsen, Myking (NO); Erik Michelsen, Fana (NO)

(72) Inventors: Stein Kyrre Monsen, Myking (NO); Erik Michelsen, Fana (NO)

(*) Notice: Subject to any disclaimer, the term of this patent is extended or adjusted under 35 U.S.C. 154(b) by 220 days.

(21) Appl. No.: 15/315,797

(22) PCT Filed: Jun. 4, 2015

(86) PCT No.: PCT/NO2015/050101
§ 371 (c)(1),
(2) Date: Dec. 2, 2016

(87) PCT Pub. No.: WO2015/187036
PCT Pub. Date: Dec. 10, 2015

(65) Prior Publication Data
US 2017/0138253 A1    May 18, 2017

(30) Foreign Application Priority Data

Jun. 4, 2014 (NO) .................................. 20140700

(51) Int. Cl.
*F02B 53/06* (2006.01)
*F02B 53/10* (2006.01)
(Continued)

(52) U.S. Cl.
CPC .......... *F02B 53/06* (2013.01); *F01C 1/3562* (2013.01); *F02B 53/10* (2013.01); *F02B 53/14* (2013.01);
(Continued)

(58) Field of Classification Search
CPC ................................ F01C 1/3562; F02B 53/00
(Continued)

(56) References Cited

U.S. PATENT DOCUMENTS 1,101,794 A * 6/1914 Friend ..................... F02B 53/00
123/203
1,275,619 A * 8/1918 Smiley .................. F01C 1/3562
123/212

(Continued)

*Primary Examiner* — Phutthiwat Wongwian
*Assistant Examiner* — Edward Bushard
(74) *Attorney, Agent, or Firm* — Flener IP & Business Law; Zareefa B. Flener

(57) ABSTRACT

A rotary motor (10;1 10) is described, comprising a stationary cylinder housing (12;1 12) having an internal mainly circular rotor (20;120) mounted on a drive shaft (14;1 14) and where the rotor (20;120) is equipped with a piston (16;1 16) and that provided about the rotor (20;120) is a circular working chamber (18;1 18) with an inlet (42;142) and an outlet (32;132) for supply and removal, respectively, of the relevant drive medium, where provided in front of the inlet (42; 142) of the working chamber (18;1 18) there is a passage valve (30; 130) arranged to allow passage of the piston (16;1 16) and to close the working chamber (18;1 18) after the piston (16;1 16) has passed. The inlet (42;142) in the cylinder housing (12;1 12) is connected to an external combustion chamber (40; 140) for introducing the drive medium to the working chamber (18;1 18), where the combustion chamber (40; 140) comprises means for increasing the compression pressure in the combustion chamber, as said means comprises a compression rod (50;150), or a piston, arranged to be pushed into the combustion chamber (40;140) to increase the compression pressure.

5 Claims, 4 Drawing Sheets

(51) Int. Cl.
   *F01C 1/356* (2006.01)
   *F02B 53/14* (2006.01)
   *F02B 55/02* (2006.01)
   *F02B 55/08* (2006.01)

(52) U.S. Cl.
   CPC .............. *F02B 55/02* (2013.01); *F02B 55/08* (2013.01); *Y02T 10/17* (2013.01)

(58) Field of Classification Search
   USPC ........................................................ 123/202
   See application file for complete search history.

(56) References Cited

U.S. PATENT DOCUMENTS

| | | | | |
|---|---|---|---|---|
| 4,393,829 | A * | 7/1983 | Gardiner | F01C 1/36 123/249 |
| 5,755,197 | A * | 5/1998 | Oplt | F01C 1/3562 123/228 |
| 6,129,068 | A * | 10/2000 | Wingate, Jr. | F01C 1/46 123/248 |
| 6,347,611 | B1 * | 2/2002 | Wright | F01C 1/3566 123/223 |
| 7,231,894 | B2 * | 6/2007 | Driver | F01C 1/39 123/235 |
| 7,765,962 | B2 * | 8/2010 | Colombi | F01C 1/3562 123/43 R |
| 8,671,907 | B2 * | 3/2014 | Mistry | F01C 1/22 123/200 |

* cited by examiner

ROTARY MOTOR

The present invention relates to a rotary motor, comprising a stationary cylinder housing with an internally, mainly circular rotor mounted on a drive shaft, and where the rotor is equipped with a piston, and in where a circular working chamber is provided about the rotor, with an inlet and an outlet for supply and removal, respectively, of the relevant drive medium, where in front of the inlet of the working chamber a passage valve is provided, arranged to allow passage of the piston and to close the working chamber after the piston has passed.

A traditional piston motor comprises a crankshaft, a connecting rod and a piston. The connecting rod transfers the heat work that is delivered to the piston to the crank. The piston moves up and down in the same path all the time while the crankshaft is forced around as a result of the connecting rod/crank geometry.

There are many different piston motors but there are two main types (four-stroke and two-stroke engines). They work as follows: The piston starts at the top and draws in air, possibly fuel, on the way down (for two-stroke engines air will be sucked in under the piston as part of the previous stroke, while when the piston goes down air is let out over the piston when the piston approaches the bottom). When the piston has reached the bottom it stops and is set in motion again, this time in the opposite direction. On the way up the air is compressed when the piston reaches the top and the air/fuel mixture is ignited, fuel can be injected in cases where the compression temperature is sufficient to ignite the fuel, for example, in diesel engines.

If it relates to a four-stroke engine, the engine will use the next stroke to get rid of the exhaust. In the case of a two-stroke engine this will occur in the lower part of the stroke. In most piston engines the compression will take place in the same cylinder as the work is carried out.

In most piston engines, the ratio between the compression volume and the volume of the working cylinder will be constant (some engines will have varying valve timing to compensate for the negative effect of this, they will still be physically constant). In most piston engines, each piston will stop two times per revolution and then accelerate (this does not apply to Wankel motors, they are however eccentric).

In most piston engines, the piston speed will also vary at a locked rpm, and most piston engines employ piston rings to seal and position the piston in relation to the cylinder.

From prior art reference is made to U.S. Pat. No. 5,961,310 A, US 2013/092122 A1, U.S. Pat. Nos. 1,101,794 A, 708415 A, 1,027,182 A, 1,242,693 A, 1,406,140 A and WO 2011/099885 A1, all of which deal with different types of rotary motors.

The present invention relates to an engine with a circular working chamber, in which a piston rotates at a constant angle to the driveshaft/crankshaft during the whole of the 360° degrees/revolution movement. Of this movement typically 250 degrees/revolution (not limited to) will be relevant for power output, the next stroke cycle will begin immediately after passing TDC and after a control/passage valve has closed. This is a first advantage with respect to a conventional piston motor which only utilises 90-180°.

In the present solution, the piston will have approximately the same speed throughout the whole rotation and, for that reason, will only need to deliver the energy to the piston which is required to compensate for the speed loss that is given to the mechanical work of the motor. A traditional piston motor has an uneven piston speed and must deliver energy to accelerate the piston/connecting rod from a full stop twice per 360 degrees (at TDC and BDC). This is a second advantage with respect to a conventional piston motor.

The shape/geometry of the piston controls the form of the circular working chamber. Somewhere on the outer diameter of the circular working chamber a control valve/passage valve that lets the piston through is mounted. It is this valve which ensures that the piston can do repetitive work for each rotation. In front of, or as part of, this valve an outlet for the exhaust is situated. Basically energy is not used in the form of mechanical work in connection with the exhaust control. Immediately after the control valve/passage valve is an inlet from a combustion chamber where energy is supplied to create rotation of the piston. The mean pressure fed from the combustion chamber multiplied by the projected area of piston gives the power of the engine at the relevant point in time. The combustion chamber is preferably separate from the working chamber and is located in close proximity to the outer diameter of the circular working chamber. The combustion chamber can have a fixed or adjustable volume which can be independent of the cylinder volume of the engine, but will typically be 1:10 of the engine cylinder volume.

The combustion chamber comprises one or more valves, in which one or more are in the form of a rotary valve. Combustion air is supplied to the combustion chamber from a pressure source that can be a compressor integrated into the motor, externally mounted and/or together with an external pressure vessel that has one or more sources to generate air under pressure. Furthermore, the combustion chamber could be fitted with a compression unit, for example, in the form of a rod. This rod could be forced into the combustion chamber to increase the compression pressure and thereby the starting temperature of the combustion. This means that the compression/temperature ignition can also be used in situations where the fuel has a high self-ignition temperature, for example, petrol or natural gas. The present motor will therefore potentially have a radically improved efficiency compared to traditional motors when such fuels are used. In traditional motors there will be major challenges associated at a high compression/start temperature. Because the motor and the combustion chamber are part of the same, the "whole motor" must be dimensioned for the tremendous load an increased compression will result in. This is a third advantage with the motor with respect to the commercial motors today.

The valves in the combustion chamber can be controlled separately so that the combustion conditions can be adjusted to achieve optimum combustion. Fuel can be injected directly into the combustion chamber and the injection timing can be controlled. Depending on the conditions for self-ignition, (compression ignition as mentioned above) in the combustion chamber, a separate ignition source will normally be used, corresponding to a spark plug.

The purpose of the invention is to create an internal combustion motor of rotary type which uses considerably less energy than today's internal combustion motors. The motor will have considerably lower manufacturing and maintenance costs than engines on the market today. The motor is initially intended to be used to drive generators or be a replacement for internal combustion engines in today's hybrid propulsion solutions. Other applications are, of course, also relevant.

The above mentioned objects and other advantages are achieved with a rotary motor comprising a stationary cylinder housing with an internal circular rotor mounted on a drive shaft, and where the rotor is fitted with a piston and arranged around the rotor is a circular working chamber with an inlet and an outlet for supply and removal, respectively, of a relevant drive medium, where in front of the inlet to the working chamber, a passage valve is arranged, set up to permit the passage of the piston and to close the working chamber after the piston has passed, characterised in that the inlet is connected with an external combustion chamber for introducing the drive medium to the working chamber, where the combustion chamber comprises means for increasing the compression pressure in the combustion chamber, as said means comprises a compression rod or compression piston arranged to be pushed into the combustion chamber to increase the compression pressure.

Alternative embodiments are given in the respective dependent claims.

In one embodiment of the motor a slide can be arranged in the cylinder housing, where the slide is arranged to control inserting of the compression rod, and where the slide motion is adapted to be controlled by a cam plate mounted on the drive shaft.

The passage valve can be formed as a spring mounted tilt valve in a recess inside the outer surface of the working chamber and protrude out into the working chamber, and can also be forced or pushed into the recess to allow the passage of the piston.

Furthermore, the passage valve can be connected with a rocker arm, where the rocker arm is arranged to be influenced by a cam plate during rotation of the drive shaft and to transmit synchronous movement to the passage valve.

In one embodiment, the rocker arm and the cam plate can be arranged in a space which is placed next to the working chamber, and where the juxtaposed space and the working chamber is bounded by an internal wall.

Furthermore, the passage valve can be mounted in a hinge at one end and be formed with an external shape that matches the recess and with an internal shape that corresponds to the radius of the working chamber.

The passing valve can also be fitted with a through-going opening arranged to let through the exhaust, and where the opening corresponds to the exhaust outlet of the motor.

The motor combustion chamber can comprise several inlets for air and fuel, respectively, which are arranged to transform the mixture of air and fuel to pressure energy, and also a valve for control of the energy through the inlet and to the working chamber for driving the piston.

The valve for controlling the energy through the inlet to the working chamber can, in an embodiment, be a rotary valve which is controlled in accordance with the rotation of the rotor fitted with the piston.

In this case, the rotary valve can be connected to a drive belt which is driven during rotation of the drive shaft and where the drive belt is connected to a first drive wheel mounted on the drive shaft and a second drive wheel connected to the rotating valve.

The volume of the combustion chamber can be independent of the volume of the working chamber. For example, the volume of the combustion chamber can be 1:10 of the volume of the working chamber.

Furthermore, the combustion chamber can comprise several valves for the control of the intake of air and the injection of fuel, where the valves are arranged to be controlled separately so that the combustion conditions can be adjusted to achieve an optimum combustion.

The combustion chamber can also be connected to an external pressure source for supplying combustion air to the combustion chamber. For example, said external pressure source can be a compressor or a pressure tank.

The piston can be formed as a vane or a peg on the rotor.

Furthermore, the passage valve can be placed in, or adjoining, the TDC of the motor work chamber.

In further embodiments, the passage valve can be formed as a slide or a rod that can be pushed into a boring or recess inside the working chamber, where the passage valve, under the influence of a spring force, is arranged to be pushed out of the boring and, under the influence of the rotor, is arranged to be pushed into the boring. The external combustion chamber can comprise a rotary discharge valve to control the supply of air through an inlet into the combustion chamber, and also a rotary supply valve to close or open for an inlet into the working chamber.

Said discharge valve and supply valve can be formed as rotatory shafts fitted with respective boreholes disposed transversely through the shafts.

The compression rod can be formed as a piston that can be arranged to be pushed into the combustion chamber between a rotary discharge valve to control the supply of air through an inlet into the combustion chamber and a rotary supply valve to close or open for an inlet into the working chamber.

The rotor can be formed in a mainly circular shape, where the piston is provided as a transverse edge on the rotor, whereby the radius of the rotor is largest in the region of the piston and then gradually decreases about the rotor in its drive direction.

The rotor can further comprise a recess or hole with the mass removed for balancing of the rotor.

The invention shall now be described in more detail with the help of the enclosed figures, in which.

Figure 1:
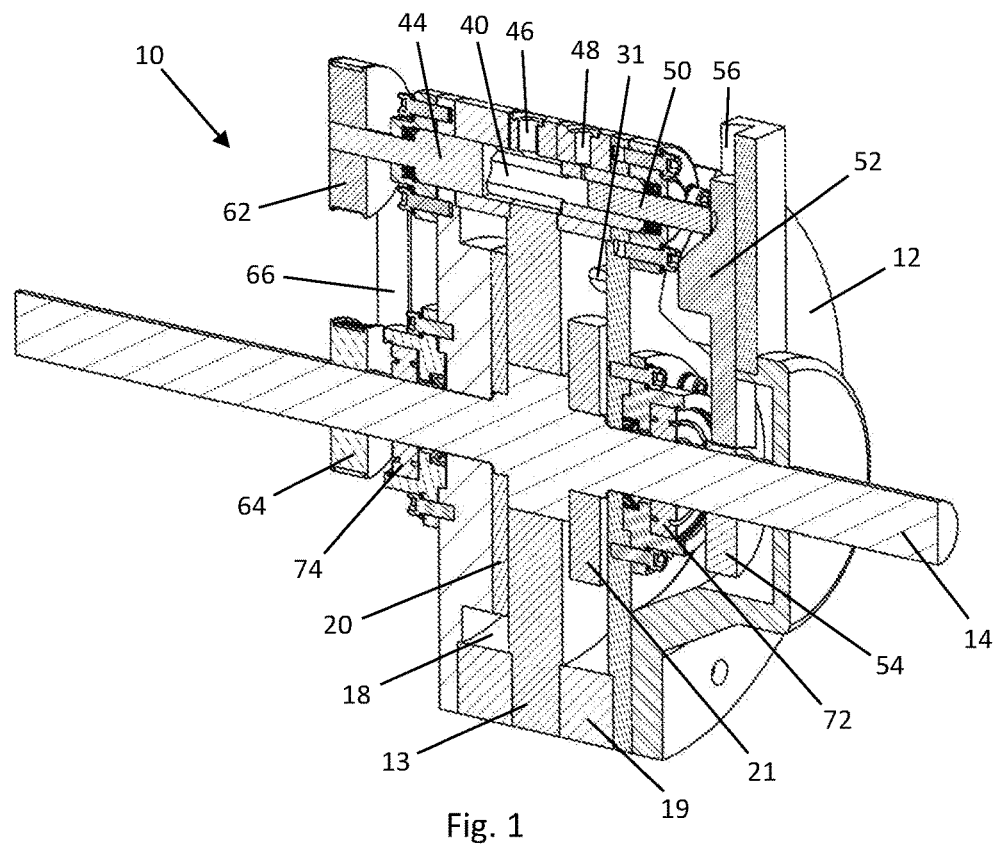
FIG. 1 shows a section through a first embodiment of a motor according to the invention.

As FIG. 1 shows, the present motor 10 comprises a motor housing or cylinder housing 12 with a partially or completely through-running drive shaft 14. The cylinder housing 12 is split into several chambers, where a working chamber 18 with a rotor 20 equipped with a piston 16 is provided mainly centrally in the cylinder housing. Next to the working chamber 18, an adjacent chamber 19 is provided, equipped with means for controlling a passage valve for the piston 16. The working chamber 18 and the adjacent chamber 19 are preferably divided by an interior wall 13. The drive shaft 14 runs through the inner wall 13 and is, in a known way, mounted in respective bearings 72,74 in the cylinder housing 12, and can also optionally be mounted in one continuous opening in the interior wall 13.

The rotor 20 is formed in a circular shape and the working chamber 18 is formed with a corresponding circular shape, however with a larger diameter so that the working chamber 18 defines a closable circular-cylindrical space, in which the piston 16 can move as the rotor rotates. The piston 16 is attached to the rotor 20 and can be formed, for example, as a peg or vane that fills the circular-cylindrical space which forms the working chamber 18. The piston 16 can be retrofitted to the rotor 20 or be formed integrated with the rotor.

As mentioned, in the working chamber 18, a passage valve 30 is provided which is arranged to allow passage of the piston 16 and to close the working chamber 18 after the piston 16 has passed. This passage valve (or control valve) can be in the form of a tilt valve 30 which is springily mounted in a recess 34 internally in the outer surface 18a of the working chamber, which can be pushed or forced into the recess 34. The tilt valve 30 is fitted with an internal surface with the same radius as the interior outer surface 18a of the working chamber, so that the piston 16 can pass unimpeded by, and has a height sufficient to close the working chamber 18 after the piston 16 has passed.

To control the tilt valve 30 in accordance with the passage of the piston 16, the adjacent chamber 19 is equipped with a cam plate 21 which rotates together with the drive shaft 14. During rotation of the cam plate 21 a rocker arm 31 is influenced in the adjacent chamber 19, which in turn transmits the same motion to the tilt valve 30. The tilt valve 30 in the working chamber 18 can be mounted on a shaft 36, and the rocker arm 31 in the adjacent space 19 can be mounted on the same shaft. Thus, the shaft 36 can extend through the inner wall 13. Other ways to transfer the motion from the rocker arm 31 to the tilt valve 30 are also possible, for example, that the rocker arm is fitted with a rod that extends through the internal wall 13 and pushes on the tilt valve 30.

The tilt valve 30 can also be controlled independently of the rotation of the drive shaft 14, for example, with an external actuator or be controlled electronically, if this is needed or is desired. Thus, the rotation of the rotor, the piston movement or the rotation of the drive shaft can be monitored and signals can be transmitted for activation or control of the tilt valve 30.

The motor 10 includes in an upper portion of the cylinder housing 12, as shown in FIG. 1, a combustion chamber 40 which, in a known way, is arranged to mix air and fuel, respectively, and to transform the mixture of air and fuel to pressure energy that is supplied to the working chamber 18. The air and fuel are supplied to the combustion chamber 40 via respective inlets 46,48. The pressure energy is supplied from the combustion chamber 40 via one or more inlets 42 to the working chamber 18. For the control of the energy through the inlet 42 and to the working chamber 18 for operation of the piston 16, the combustion chamber 40 includes a valve 44. The valve 44 can also be arranged to adjoin the combustion chamber 40.

In one embodiment of the invention the valve 44, for controlling the energy through the inlet 42 to the working chamber 18, can be a rotary valve 44 which is controlled by the drive shaft 14 with the help of a drive belt, such as a toothed belt or chain. It can also be controlled independently of the drive shaft with an external actuator, or be controlled electronically if this is required, as explained in connection with the tilt valve.

As shown on the left in FIG. 1, a first drive wheel 64 is attached to the drive shaft 14 and rotates together with this. Furthermore, a drive belt 66 connects the first drive wheel 64 to a second drive wheel 62 connected to the rotary valve 44. Upon movement of the piston 16, which thereby drives rotation of the rotor 20 and the associated drive shaft 14, the rotary valve 44 will, via the drive belt 66 in synchrony with the rotation of the piston 16, open for inlet via the inlet 42 to the working chamber 18.

Discharge of exhaust gas from the working chamber 18 occurs via one or more outlets 32 which are preferably positioned in the same area as the passage valve 30. For this reason, the passage valve 30 is preferably provided with a through-going opening 30a which corresponds with the exhaust outlet 32. The exhaust can thereby be let out independently of whether the passage valve is in the closed or open position.

Furthermore, the combustion chamber 40 can comprise means for increasing the compression pressure in the combustion chamber 40. In one embodiment, said means comprises a compression rod 50 or the like, arranged to be pushed into the combustion chamber 40 to increase the compression pressure. The influence of the rod 50 can, as shown in FIG. 1, be controlled by a slide 52 with a tilted side edge which, when pushed up or down, controls the pushing in or pushing out of the compression rod 50 into or out of the combustion chamber 40. The slide 52 can, as shown, be pushed up and down in a slide groove 56 in the cylinder housing 12. The "up" or "down" must here be understood as shown in the figure.

The movement of the slide 52 can, as shown in FIG. 1, be controlled by a cam plate 54 mounted on the drive shaft 14. It can also be controlled independently of the drive shaft with an external actuator, or be controlled electronically if needed, as discussed above.

Figure 2:
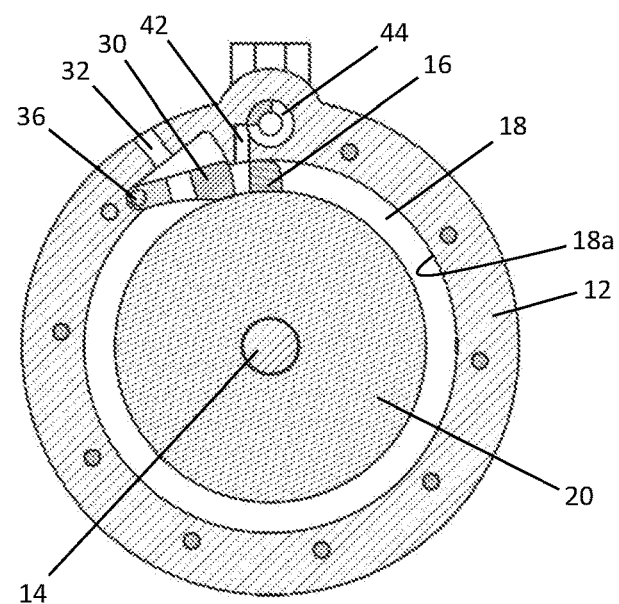
FIGS. 2 and 3 show a section through the working chamber of the motor shown in FIG. 1, and with the piston in the initial phases of a work stroke.
Figure 3:
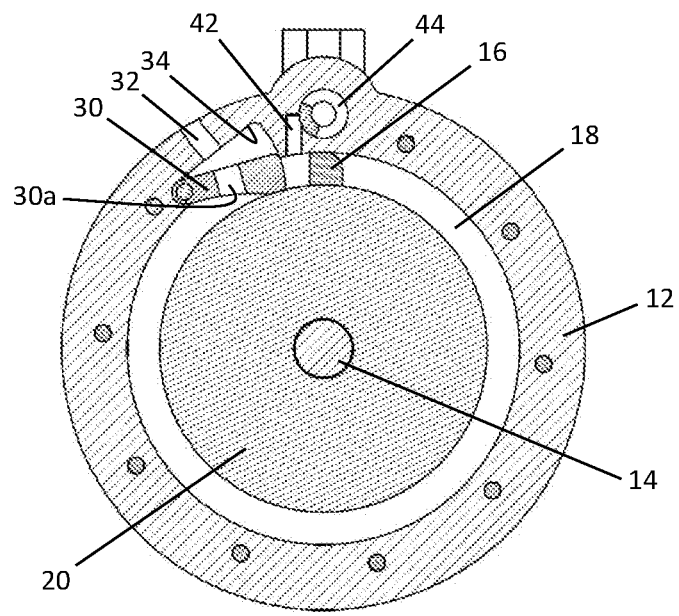
Figure 4:
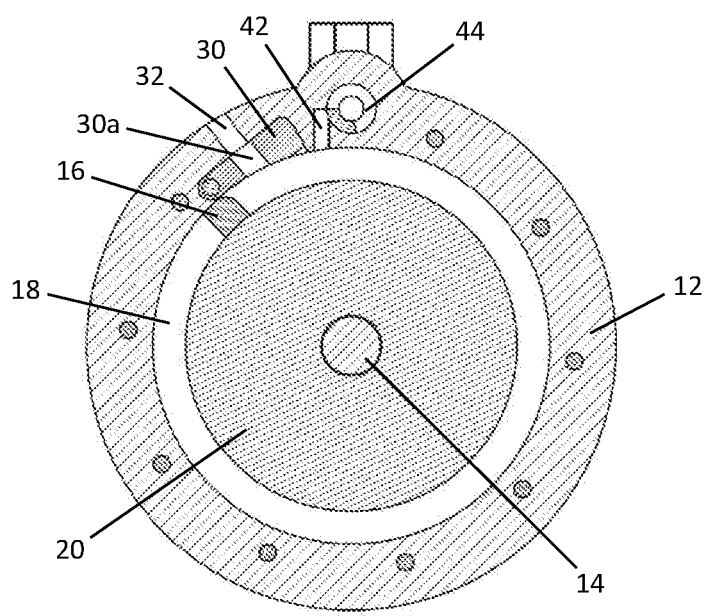
FIG. 4 shows a corresponding section through the working chamber of the motor shown in FIG. 1, and when the piston approaches the end of a work stroke.

Examples of the work stroke of the motor are given below:
1. Pressurised combustion air is supplied to the combustion chamber 40 and valves, such as valves 46,48, in the combustion chamber are closed so that it becomes sealed.
2. Depending on the fuel, the compression rod 50 is pushed into the combustion chamber 40.
3. The piston 16 is brought into a position where it has passed the inlet 42 from the combustion chamber 40 to the working chamber 18, as shown in FIG. 2.
4. Fuel is supplied and an external ignition source is used if necessary.
5. The combustion pressure from the combustion chamber 40 is let out to the working chamber 18 by opening the valve 44.
6. The combustion pressure acts on the piston area and the piston 16 drives the rotor 20 to start to rotate (clockwise in FIG. 2).
7. At this point the valve 42 in the working chamber 18 is closed so that the combustion pressure can only act to create movement of the piston 16 in one direction (pushing the rotor 20 clockwise), as shown in FIG. 3.
8. When the piston 16 moves it pushes the exhaust from the previous work stroke ahead of it and out of the exhaust outlet 32 which is located just before the valve 44 in, or adjoining, the working chamber 18.
9. When the work stroke approaches the end, just ahead of the valve 44 in, or adjoining, the working chamber 18, the passage valve 30 in the working chamber 18, is opened and lets the piston 16 through so that it is in a position similar to that in point 2, and as shown in FIG. 4.
10. From there, the strokes 2-8 are repeated until access to the fuel is shut off.

FIGS. 5-8 show a second embodiment of a motor 110 according to the invention. The motor 110 functions, in principle, in the same way as described in connection with the first embodiment and corresponding parts are therefore not explained in more detail. Combinations of the first and second embodiment are further possibilities.

In the following, the main features of the second embodiment shall be explained in more detail. The motor 110 comprises, in a corresponding way, a motor housing or cylinder housing 112 with a partially or completely through-going drive shaft 114. The cylinder housing 112 is divided into several chambers, where a work chamber 118 with a rotor 120 fitted with a piston 116 is provided mainly centrally in the cylinder housing.

The rotor 120 is formed with a mainly circular shape, but so that the piston 116 is provided as a transverse edge on the rotor. The radius of the rotor 120 from, for example, the drive shaft 114 is thus largest at the piston 116 and thereafter gradually decreases about the rotor in its drive direction. The reduction of the radius can be carried out fully or partially about the rotor, and if required, completely round to a point just before the edge of the piston 116. As the mass of the rotor 120 will be greater in the region of the piston 116, the rotor 120 can therefore comprise a recess or hole 160 for balancing of the rotor 120. The mass that is removed from the recess or hole 160 thereby evens out and balances the rotor 120.

About the rotor 120, a circular working chamber 118, with an inlet 142 and an outlet 132 for supply and removal, respectively, of the relevant drive medium, is correspondingly provided. In front of the inlet 142 in the working chamber 118, a passage valve 130 is provided, arranged to allow passage of the piston 116 and to close the working chamber 118 after the piston 116 has passed. The passage valve 130 is, in this case, formed as a slide, rod or the like, arranged in a boring, slit 134 or the like internally in the outer surface of the work chamber 118, and preferably spring loaded. The passage valve 130 can be controlled by a camshaft (not shown) or in another way with the help of a belt or chain.

The inlet 142 is preferably located adjoining the passage valve 130 so that as little volume as possible is generated. For that reason, the inlet 142 can be somewhat deflected.

A combustion chamber 140 is provided externally to the cylinder housing 112. The combustion chamber 140 comprises an inlet 146 for air and an inlet nozzle 148 for fuel and also, for example, a spark plug 152 to ignite the mixture of air and fuel. Ignition sources other than a spark plug can, of course, be used. The combustion chamber 140 also includes an outlet 154 for the combustion pressure which is connected to the inlet 142 in the cylinder housing 112.

The external combustion chamber 140 further comprises a discharge valve 156 for air and a supply valve 158 to let in the combustion pressure or energy through the outlet 154 to the inlet 142 in the cylinder housing 112 and into the working chamber 118. The discharge valve 156 and the supply valve 158 can, in a simple embodiment, be formed as respective rotating shafts that are driven by a belt or a chain, or in any other way, in accordance with the rotation of the rotor 120, and which is provided with respective boreholes 156a, 158a disposed transversely through the shafts. The combustion chamber 140 further includes, as previously explained, a compression rod or a compression piston 150 arranged to be pushed into the combustion chamber 140 to increase the compression pressure.

The discharge valve 156 and supply valve 158 can be operated in synchrony or asynchrony if necessary.

Figure 6:
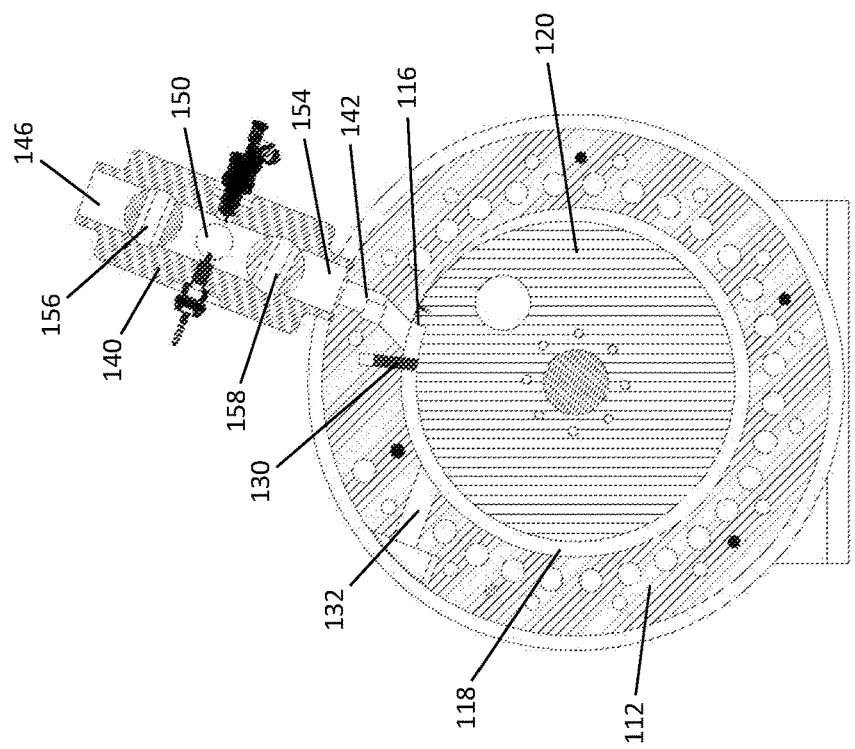
FIGS. 5, 6 and 7 show cross-sections of a second embodiment of a motor according to the invention.
Figure 5:
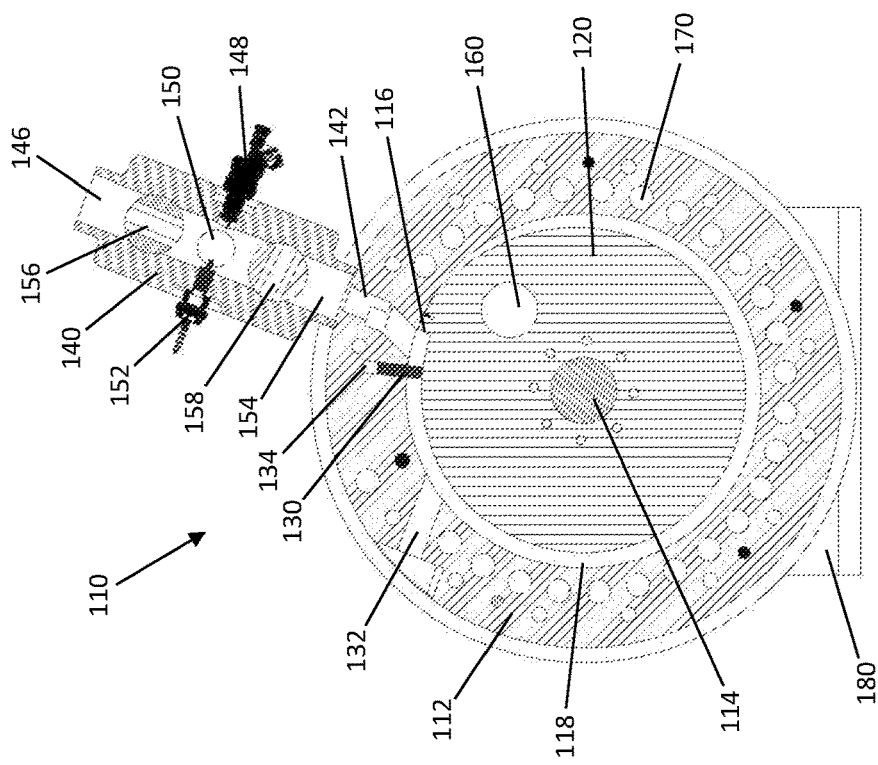
Figure 8:
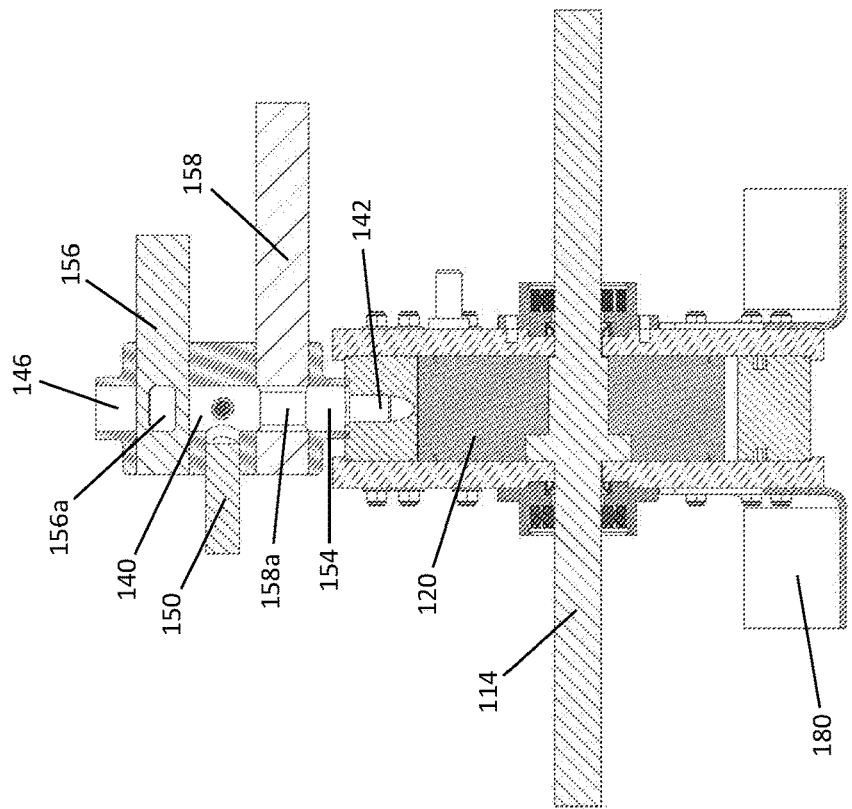
FIG. 8 is a longitudinal sectional of the second embodiment of a motor according to the invention.
Figure 7:
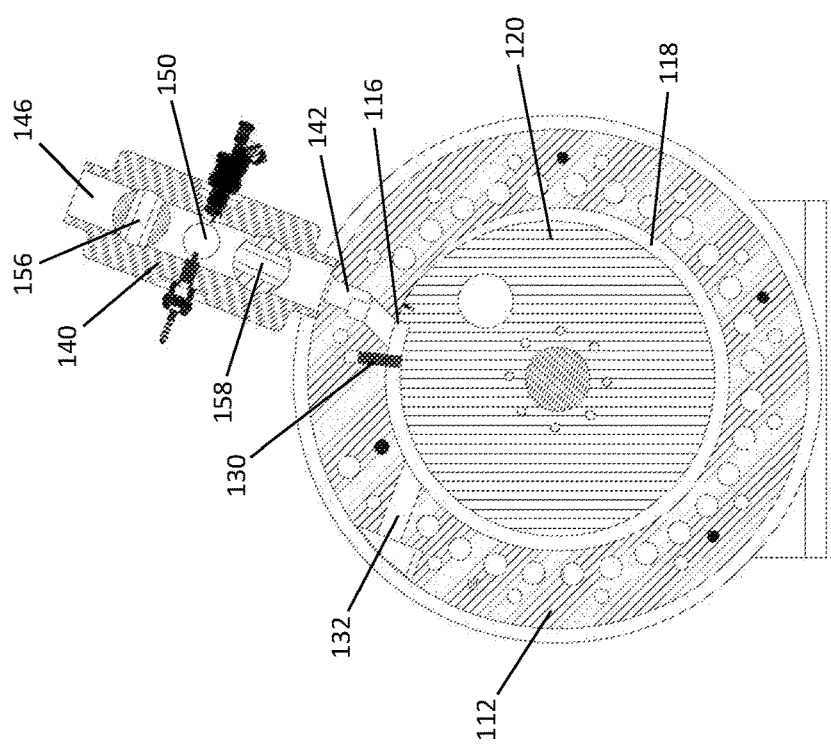

FIG. 5 shows that the supply valve 158 is closed, i.e. the borehole 158a has been rotated so that the mixture of air and fuel cannot pass, while the discharge valve 156 is open, i.e. the borehole 156a is rotated so that air can pass. In FIG. 6 both the discharge valve 156 and the supply valve 158 are closed, and the inlet nozzle 148 supplies fuel into the combustion chamber 140. The inlet nozzle 148 can supply fuel into the combustion chamber 140 even before the discharge valve closes. In order to increase the compression pressure the compression rod 150 is now pushed into the combustion chamber 140. The compressed mixture of air and fuel is ignited with the help of the spark plug 152, and as shown in FIGS. 7 and 8, the supply valve 158 is opened in that the borehole 158a is rotated to an open position to release the combustion pressure into working chamber 118, whereupon the rotor 120, under the influence of piston 116, is made to rotate.

As all motors, the present motor, be it the first or second embodiment, generates heat. For this reason, a cooling system can be used, for example, a water cooling system which forces water to flow through channels 170 in the cylinder housing.

Control of the various valves, nozzles, etc. is, in a known way, directly or indirectly controlled by the rotation of the rotor. Any details omitted in the description are therefore regarded to be known to a person skilled in the arts in this context.

Furthermore, the motor can comprise a base 180 or the like for fitting to other equipment that shall be driven or influenced.

The invention claimed is:

1. A rotary motor, comprising:
    a stationary cylinder housing having an internal rotor mounted on a rotatable drive shaft;
    a working chamber disposed between the stationary cylinder housing and the internal rotor the working chamber having a working chamber inlet and a working chamber outlet;
    a piston defined by a transverse edge of the rotor;
    a spring loaded passage valve disposed on a side of the working chamber the inlet opposite the direction of rotation of the rotor to allow passage of the piston and to close the working chamber after the piston has passed;
    an external combustion chamber comprising:
        an external combustion chamber inlet having a rotary discharge valve,
        an external combustion chamber outlet having a rotary supply valve, and
        a compression rod operably connected with the rotatable drive shaft and configured to be driven thereby to move into the external combustion chamber to increase a drive medium pressure within the external combustion chamber when both the rotary discharge valve and the rotary supply valve are closed; and
    wherein
        the working chamber inlet is connected to the external combustion chamber outlet for introducing the drive medium to the working chamber.

2. The rotary motor according to claim 1, wherein the spring loaded passage valve comprises a rod biased by a spring to be pushed through a boring in the cylinder housing and into the working chamber, and wherein the rod is pushed back into the boring by passage of the piston.

3. The rotary motor according to claim 1, wherein the discharge valve and the supply valve each comprise a rotary shaft having a boring disposed transversely through the rotary shaft.

4. The rotary motor according to claim 1, wherein the piston is disposed on a peripheral edge of the rotor so that the radius of the rotor is greatest at the piston and decreases about the rotor in the direction of rotation of the rotor.

5. The rotary motor according to claim 1, wherein the rotor comprises a recess for balancing of the rotor.

* * * * *